June 9, 1931. F. W. EDWARDS 1,808,978
TERMINAL VALVE FOR FORCE FEED LUBRICATORS
Filed July 8, 1927
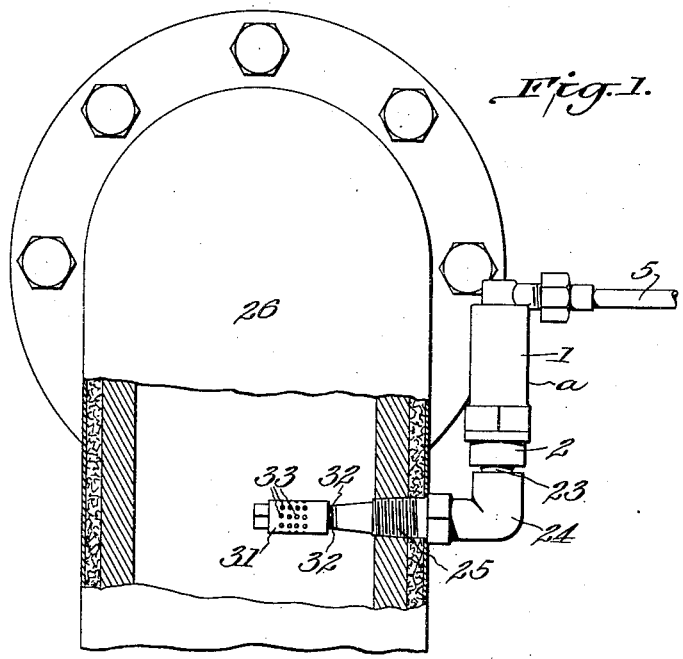
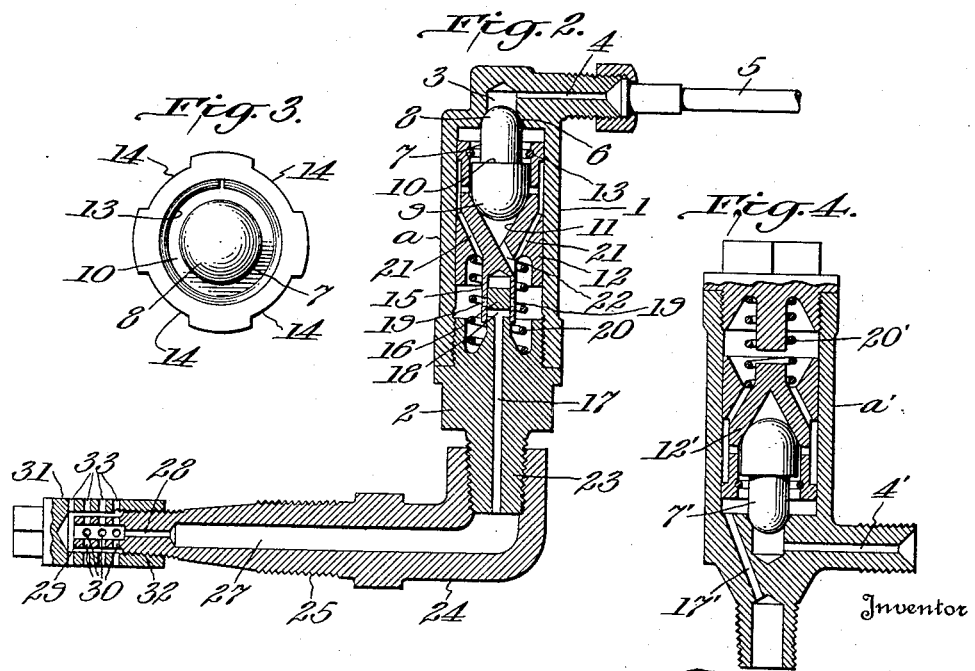
Inventor
Frank W. Edwards
Attorney Patented June 9, 1931

1,808,978

UNITED STATES PATENT OFFICE

FRANK W. EDWARDS, OF CHICAGO, ILLINOIS

TERMINAL VALVE FOR FORCE FEED LUBRICATORS

Application filed July 8, 1927. Serial No. 204,213.

This invention relates primarily to what is known in the art as a terminal valve, that is, a valve used for obstructing the oil passage between a lubricator, usually of force-feed type, and a lubricant atomizing or nebulizing nozzle placed in the steam passage leading to the steam chest of a locomotive or other steam engine.

In such installations, difficulty is often encountered in preventing the entrance of water-of-condensation into the oil pipes, with the attendant subsequent faults in feed of the oil and efficient lubricating effect.

The object of the invention is to provide a terminal valve of such design that this difficulty is eliminated, and one in which the parts are so formed and assembled as to make the valve efficient despite variations in alignment in the assembly of its elements.

The invention consists, broadly, in a terminal valve for force feed lubricators, comprising a valve body having an inlet port and an outlet or discharge port, a valve-carrier member or housing slidable in the valve body, a check-valve carried by the housing and acting under the influence of pressure in the oil line to open the inlet port, and means carried by the housing and cooperating with means adjacent to the discharge port for positively opening and closing the discharge port in response to the opening and closing of the inlet port, as I will proceed now to explain and finally claim.

In the accompanying drawings illustrating the invention, in the several figures of which like parts are similarly designated, Figure 1 is a fragmentary sectional elevation of a typical steam pipe lubricant terminal installation including the valve of my invention. Fig. 2 is a central vertical section of a preferred form of my valve and a preferred form of terminal upon a larger scale. Fig. 3 is a plan view of the valve-carrier or housing and check valve, on a still larger scale. Fig. 4 is a central sectional elevation of a modified form of the valve.

In its preferred form, as shown in Figs. 1 and 2, the terminal valve of my invention has a body $a$ composed of a casing 1 and a plug 2. Communicating with the interior of the body $a$ is an oil-inlet bore 3 connected by a duct 4 and pipe 5 with any suitable force-feed lubricator. The oil-inlet bore 3 terminates in a conical or other appropriately shaped valve seat 6 at the top of the casing 1, as shown, and cooperating with this seat is a check-valve 7 of the type shown and described in my copending application Serial No. 120,173, filed July 2, 1926. This valve 7 is of a double-diameter, generally cylindrical form and has rounded ends 8 and 9 and a shoulder 10. The end 8, which is the smaller end, cooperates with the seat 6, and the larger end 9 bears against a conical bearing 11 in the valve-carrier member or housing 12. The valve 7 is retained within the housing 12 by means of a spring-ring 13, of well-known type, against which the shoulder 10 may strike.

The housing 12 has a sliding fit in the casing 1, and its upper end is notched as shown at 14, Fig. 3, for a purpose hereinafter explained. This housing is provided at its lower end with a tubular extension 15 which slidingly cooperates with a cylindrical extension 16 of the plug 2. The plug 2 has a discharge opening 17 terminating in a cross-bore 18 in the extension 16, and the sleeve 15 is provided with ports 19 in vertical alignment with the cross-bore 18. It will be seen, therefore, that the extension 16 with its cross-bore 18, and the sleeve 15 with its ports 19, cooperate to form a slide-valve for controlling the discharge opening of the terminal valve.

The check-valve 7 is normally held to its seat 6 by means of a spring 20 confined between the housing 12 and plug 2 and having bearings in both of these parts.

The housing 12 is provided with a plurality of ducts 21 through which the oil may find its way from the inlet 3 to the discharge 17, and it also has drain passages 22 through which oil passing under the end 9 of valve 7 may reach the discharge opening 17.

As explained in my application hereinbefore mentioned, the design and mounting of the valve 7 makes exact axial alignment of the housing or carrier member 12 with the seat 6 unnecessary, because the valve 7 may pivot upon its end 9 and its end 8 will always find its seat. Moreover, the valve 7 is free to rotate about its longitudinal axis and is therefore self-grinding.

The plug 2 is provided with a screwthreaded extension 23 through which the opening 17 extends and this extension is threaded into the oil terminal, or terminal plug, which comprises a plug 24 having a threaded portion 25 by means of which it may be fixed in a steam pipe 26 (Fig. 1) at some point intermediate the engine throttle and steam chest. The plug 24 has an oil passage 27 communicating through a bore 28 with a discharge nozzle 29. This nozzle is provided with a plurality of transverse openings 30 and is covered by a cap 31 screwthreaded onto the plug at 32 and provided with perforations 33.

From the installation described, it will be apparent to those skilled in the art that the lubricator is designed to function only, in case of a locomotive engine, when the locomotive is in motion, either with the throttle open or when drifting, and in the case of a stationary engine, when the engine throttle is open, and thus in the case of a locomotive engine, there will be pressure in the pipe 5 at all times when the locomotive is in motion, and in the case of a stationary engine, there will be pressure in the pipe 5 only when the engine throttle is open.

With these premises in mind, the operation of my invention may be described to be as follows:—When the throttle is open and the engine running, steam is passing through the steam pipe 26 from the boiler to the steam chest and oil pressure is being maintained in pipe 5 by the action of the forcefeed lubricator.

This oil pressure in the pipe 5 is sufficient to unseat the check-valve 7, and acting upon it and upon its shoulder 10 and upon the top of the housing 12, will force the housing down to the limit of its downward movement as determined by the length of the tubular extansion 15 relatively to the height of the cylindrical extension 16, at which point the ports 19 register with the crossbore 18, thus establishing communication between the oil line 5 and the plug 24 and permitting the oil to pass through the passage 27 and bore 28 and into the discharge nozzle 29. Upon reaching the nozzle 29 the oil will be picked up by the steam which in passing through pipe 26 will rush through the perforations 33 in cap 31 and the openings 30 in the nozzle, and the oil will be broken up and atomized or nebulized, and in this finely divided state carried into the steam chest and engine cylinder.

As hereinbefore indicated, it is a common fault of terminal valves that when the engine throttle is closed the steam in the steam pipe under steam-chest pressure will condense in the terminal plug and, if there is any leakage in the terminal valve, will find its way into the oil line and eventually into the lubricator, with the result that, when the engine is again started, water instead of oil will be first fed to the engine cylinder and overheating will occur due to the lack of proper lubrication.

With my device, as soon as the engine throttle is closed and pressure in the oil line drops, the spring 20 aided somewhat by back pressure from the steam chest (though this latter is not necessary, the spring being quite strong enough) will force the housing 12 upward, thus moving the ports 19 out of register with the cross-bore 18, and will seat the check-valve 7 on its seat 6. Now, should there by any leakage of water of condensation past the slide valve formed by the parts 15 and 16, this water will gradually collect in the lower portion of the valve body $a$ and as its level rises it will force before it the oil trapped in the valve body, so that this oil will form an effective seal around the check-valve 7 at its seat 6.

The amount of water which can in this manner collect in my terminal valve is negligible so far as its effect upon engine lubrication is concerned, and it will thus be seen that by my invention I provide an automatic valve which overcomes the fault common to terminal valves now known.

Attention has been directed to the notches 14 formed in the top of the housing 12. It will be apparent that the size of these notches bears a direct relation to the effect of the incoming oil in depressing the housing 12 and thereby bringing the ports 19 into register with the cross-bore 18. I have found that the arrangement and size of the notches as shown in Fig. 3 is effective to produce the desired operation of the slide valve and permit relatively unobstructed flow of the oil. Obviously if more pressure upon the top of the housing is found to be requisite, fewer or smaller notches may be used, and if less pressure is needed, the notches may be made larger. The main consideration is, obviously, to provide sufficient surface area on top of the housing to effect its depression under the influence of the oil forced past the valve 7, to the point where the ports 19 register with the cross-bore 18.

In Fig. 4 I have illustrated a modified form of my invention. In this form the oil inlet passage 4' and the oil discharge passage 17' are both located at the lower end of the valve body $a'$, and the check-valve 7' and its housing or carrier member 12'' are inverted, so that the check-valve 7' seats downwardly instead of upwardly. Also, in this form of the invention the slide valve is omitted, the oil passing directly from the passage 4' to the passage 17' when the valve 7' is unseated by oil pressure. This modification is not designed to prevent access of water of condensation into the oil line in case of leakage, but it has merit in that the valve 7' is seated under the influence of the spring 20' augmented by back-pressure from the steam chest, the interior of the body a' being always in communication with the steam pipe 26 through the passage 17' and the plug 24. In operation, the oil under pressure unseats the valve 7' and finds its way directly to the plug 24 and steam chest through the passage 17'.

I have described my valve as designed for use primarily as a terminal valve for steam engines, but obviously its utility is not so limited, and it may serve a variety of purposes.

Various changes are contemplated as within the spirit of the invention and the scope of the following claims.

What I claim is:—

1. In a terminal valve for force-feed lubricators, a body having an inlet port and an outlet port, a housing slidable in said body, a check valve carried by said housing and acting under the influence of oil pressure to open said inlet port, means for seating said valve to close said inlet port, and means carried by the housing and cooperating with means adjacent to the outlet port for opening and closing said outlet port in response to the opening and closing of said inlet port.

2. In a terminal valve for force-feed lubricators, a body having an inlet port and an outlet port, a housing slidable in said body, a check-valve carried by said housing and normally closing said inlet port and adapted to impart sliding movement to said housing under the influence of oil pressure acting to unseat said check-valve, means for normally holding said check-valve seated, and means comprising a slide-valve for opening and closing said outlet port in response to the seating and unseating of said check-valve.

3. In a terminal valve for force-feed lubricators, a body having an inlet port and an outlet port, a check-valve normally closing said inlet port and unseated by pressure at said port, a housing carrying said check-valve and slidable in said body under the influence of pressure when said check-valve is unseated, and a slide-valve comprising a member slidable with said housing and a member carried by said body, said slide-valve controlling the opening and closing of said outlet port in response to the opening and closing of said inlet port.

4. In a terminal valve for force-feed lubricators, a body having an inlet port and an outlet port, a check-valve normally seated to close said inlet port and unseated by pressure at said port, a housing carrying said check-valve and slidable in said body, under the influence of pressure when said check-valve is unseated, means for normally holding said check-valve to its seat, and a slide-valve comprising a ported member carried by said housing and a member carried by said body and forming a connection to said outlet port, said slide-valve operating in response to sliding movement of said housing to open and close said outlet port in response to the seating and unseating of said check-valve.

5. In a terminal valve for force-feed lubricators, a valve body having an inlet port and an outlet port and providing a space between said ports, valves controlling said ports, a lubricant supply pipe connected with said inlet port, means furnishing communication between said outlet port and a steam conduit, said space normally containing a quantity of lubricant adapted to be displaced by water of condensation entering the space through said communication means when said valves are closed to form a seal around said inlet valve and thereby prevent the entrance of water into said oil supply pipe past said inlet valve.

6. In a terminal valve for force-feed lubricators, a valve body having an inlet port and an outlet port and providing a space between said ports, interconnected simultaneously operating valves controlling said ports, a lubricant supply pipe connected with said inlet port, means furnishing communication between said outlet port and a steam conduit, said space furnishing a means wherein a quantity of lubricant may be trapped when said valves are closed, said lubricant adapted to be displaced therein by entrance of water of condensation thereinto past said outlet valve to form an oil seal at said inlet valve, whereby passage of said water past said inlet valve and into said oil supply pipe is prevented.

In testimony whereof I have hereunto set my hand this 6th day of July A. D. 1927.

FRANK W. EDWARDS.